(12) United States Patent
Woo et al.

(10) Patent No.: US 12,483,023 B2
(45) Date of Patent: Nov. 25, 2025

(54) ELECTRONIC APPARATUS

(71) Applicant: SAMSUNG ELECTRONICS CO., LTD., Suwon-si (KR)

(72) Inventors: Seonghoon Woo, Suwon-si (KR); Moonyoung Kim, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 18/134,856

(22) Filed: Apr. 14, 2023

(65) Prior Publication Data

US 2023/0253874 A1 Aug. 10, 2023

Related U.S. Application Data

(63) Continuation of application No. PCT/KR2021/014042, filed on Oct. 12, 2021.

(30) Foreign Application Priority Data

Oct. 16, 2020 (KR) .................. 10-2020-0134002

(51) Int. Cl.
  *H02H 7/12* (2006.01)
(52) U.S. Cl.
  CPC ................. *H02H 7/1213* (2013.01)
(58) Field of Classification Search
  CPC .................................................. H02H 7/1213
  See application file for complete search history.

(56) References Cited

U.S. PATENT DOCUMENTS 5,946,270 A * 8/1999 Jang .................. H02H 3/04
                                                     361/91.2
6,046,896 A    4/2000 Saeki et al.
               (Continued)

FOREIGN PATENT DOCUMENTS

CN       101447666 B    10/2013
CN       109119969 A    1/2019
                (Continued)

OTHER PUBLICATIONS

Translation of CN109687712A by Clarivate Analytics Feb. 2025, 11 pages.*

(Continued)

*Primary Examiner* — Harry R Behm
(74) *Attorney, Agent, or Firm* — Sughrue Mion, PLLC

(57) ABSTRACT

An electronic apparatus includes: a converter including a switching device, an inductor, and an output capacitor; a protection switching device provided between the inductor and the output capacitor; and a protection circuit configured to provide a control voltage to: turn on the protection switching device based on a first voltage applied between the inductor and the protection switching device, the first voltage being lower than or equal to a threshold level corresponding overvoltage, and turn off the protection switching device based on the first voltage, the first voltage being higher than the threshold level. The control voltage is varied depending on variation in the input voltage or the output voltage and having a level corresponding to a threshold voltage for turning on or off the protection switching device.

10 Claims, 7 Drawing Sheets

(56) References Cited

U.S. PATENT DOCUMENTS

| | | | |
|---|---|---|---|
| 6,509,721 B1* | 1/2003 | Liebler | H02M 3/158 323/283 |
| 7,973,521 B2* | 7/2011 | Chen | G05F 1/56 323/273 |
| 2007/0047274 A1 | 3/2007 | Hwang | |
| 2008/0186644 A1* | 8/2008 | Migliavacca | G05F 1/571 361/86 |
| 2009/0002901 A1* | 1/2009 | Matsumoto | H03K 17/30 361/18 |
| 2011/0169470 A1 | 7/2011 | Itakura | |
| 2012/0223591 A1 | 9/2012 | Cheon et al. | |
| 2013/0279219 A1 | 10/2013 | Oki | |
| 2014/0092652 A1 | 4/2014 | Kihara et al. | |
| 2016/0094146 A1 | 3/2016 | Paul et al. | |
| 2016/0303948 A1 | 10/2016 | Sakai et al. | |
| 2017/0070142 A1 | 3/2017 | Sundararaj et al. | |
| 2018/0154784 A1 | 6/2018 | Xu et al. | |
| 2018/0254695 A1 | 9/2018 | Igarashi et al. | |
| 2018/0342944 A1 | 11/2018 | Chiereghin et al. | |
| 2018/0375320 A1 | 12/2018 | Ho et al. | |
| 2019/0173376 A1 | 6/2019 | Vervaart | |
| 2020/0007034 A1* | 1/2020 | Shiji | G01R 19/257 |

FOREIGN PATENT DOCUMENTS

| | | | | |
|---|---|---|---|---|
| CN | 109546624 A * | 3/2019 | | H02H 11/002 |
| CN | 109687712 A * | 4/2019 | | H02H 7/1213 |
| DE | 10 2018 112318 A1 | 11/2018 | | |
| EP | 3 048 713 A1 | 7/2016 | | |
| JP | 2004-336834 A | 11/2004 | | |
| JP | 2008-211940 A | 9/2008 | | |
| JP | 2014-73036 A | 4/2014 | | |
| JP | 2015-100241 A | 5/2015 | | |
| JP | 2016-140119 A | 8/2016 | | |
| KR | 10-0703166 B1 | 4/2007 | | |
| KR | 10-2012-0100666 A | 9/2012 | | |
| WO | 2017/038742 A1 | 3/2017 | | |
| WO | 2018/180753 A1 | 10/2018 | | |

OTHER PUBLICATIONS

Translation of CN109546624A by Clarivate Analytics Feb. 2025, 6 pages.*
Communication dated Feb. 8, 2022, issued by the International Searching Authority in counterpart International Application No. PCT/KR2021/014042 (PCT/ISA/210).
Communication dated Feb. 8, 2022, issued by the International Searching Authority in counterpart International Application No. PCT/KR2021/014042 (PCT/ISA/237).
Communication dated Jan. 25, 2024 issued by the European Patent Office in European Application No. 21880477.1.
Communication dated Dec. 6, 2024, issued by the Korean Intellectual Property Office in Korean Application No. 10-2020-0134002.
Communication issued Jun. 27, 2025 by the Korean Intellectual Property Office in Korean Patent Application No. 10-2020-0134002.

* cited by examiner

FIG. 3

| Vin | Vout | Vin-Vout | R1 | R2 | Vgs(=(Vin-Vout)*(R2/(R1+R2)) |
|---|---|---|---|---|---|
| 54V(min) | 18V(Max) | 36V(Min) | 72K | 24K | 9V |
| 70V(Max) | 18V(Max) | 52V | 72K | 24K | 13V |
| 54V(min) | 0V(min) | 54V | 72K | 24K | 13.5V |
| 70V(min) | 0V(min) | 70V(Max) | 72K | 24K | 17.5V |

ELECTRONIC APPARATUS

CROSS-REFERENCE TO RELATED APPLICATIONS

This application is a by-pass continuation application of International Application No. PCT/KR2021/014042, filed on Oct. 12, 2021, which is based on and claims priority to Korean Patent Application No. 10-2020-0134002, filed on Oct. 16, 2020, in the Korean Intellectual Property Office, the disclosures of which are incorporated by reference herein their entireties.

BACKGROUND

1. Field

The disclosure relates to an electronic apparatus including a power supply for supplying operating power, and particularly, to an electronic apparatus including a circuit to cope with overvoltage that may occur in a buck converter of a power supply or the electronic apparatus.

2. Description of Related Art

To compute and process predetermined information in accordance with certain processes, an electronic apparatus may include a central processing unit (CPU), a chipset, a memory, and other electronic components. Such electronic apparatus may be variously classified in accordance with what information will be processed and what it is used for. For example, the electronic apparatus may include an information processing apparatus such as a personal computer (PC), a server, or the like for processing general information; an image processing apparatus for processing image data; a display apparatus for displaying the processed image data as an image on a screen, an audio apparatus for audio process; home appliances for miscellaneous household chores.

Regardless of the types of electronic apparatus, any electronic apparatus may include a power supply to supply electric energy for operating based on alternating current (AC) power from the outside. The power supply may be built in the electronic apparatus or may be provided in the form of an adapter and connected to the electronic apparatus.

Typically, the power supply or the electronic apparatus converts external AC power into direct current (DC) power and adjusts the DC power to various levels required for hardware components of the electronic apparatus, thereby outputting the adjusted DC power to the corresponding hardware components. The power supply may implemented as a group of various electric components mounted onto a printed circuit board (PCB) of the electronic apparatus. As an example of the components included in the power supply, there is a direct current-direct current (DC-DC) converter that steps down a DC voltage to a required level. The DC-DC converter is configured to convert an input voltage having a relatively high level into an output voltage having a relatively low level. The DC-DC converter may be classified into an isolated converter and a non-isolated converter according to whether the input side and the output side are insulated from each other. For example, the isolated converter may employ a transformer, but the non-isolated converter may employ a switching device operating in a switching mode and an output capacitor for rectification.

The converter may have various problems. Due to structural differences, a problem that do not occur in the isolated converter may occur in the non-isolated converter. For example, it may structurally difficult for the isolated converter to transfer the input voltage from the input side to the output side as it is without being stepped down because the input side and the output side are isolated from each other. However, the non-isolated converter allows the input voltage, which has not been stepped down, to be transferred to the output side as it is through the switching device when the switching device is short-circuited due to a certain cause. Because the output voltage may be generally lower than the input voltage, the rated capacity of an output capacitor may be relatively small. Therefore, if the input voltage that has not been stepped down is applied to the output capacitor, the output capacitor may be damaged.

Accordingly, a structure for protecting the output capacitor may be required when the switching device of the non-isolated converter is short-circuited.

SUMMARY

According to an aspect of the disclosure, an electronic apparatus includes: a converter including a switching device, an inductor, and an output capacitor, the converter being configured to provide an output voltage converted from an input voltage; a protection switching device provided between the inductor and the output capacitor, the protection switching device being configured to be turned on or off to selectively connect the inductor and the output capacitor; and a protection circuit configured to provide a control voltage to: turn on the protection switching device based on a first voltage applied between the inductor and the protection switching device, the first voltage being lower than or equal to a threshold level corresponding overvoltage, and turn off the protection switching device based on the first voltage, the first voltage being higher than the threshold level, wherein the control voltage is varied depending on variation in the input voltage or the output voltage and having a level corresponding to a threshold voltage for turning on or off the protection switching device.

The protection circuit may include: a control switching device configured to be turned on or off to selectively connect a control terminal of the protection switching device to a ground; and an overvoltage detector configured to turn on or off the control switching device based on whether the first voltage is overvoltage, and the control voltage is provided to the control terminal of the protection switching device.

Each of the protection switching device and the control switching device may include an N-channel field effect transistor (FET).

The overvoltage detector may be further configured to: turn off the control switching device based on the first voltage being lower than or equal to the threshold level; and turn on the control switching device based on the first voltage being higher than the threshold level.

The overvoltage detector may be further configured to be selectively switched, by an operational amplifier (OP-Amp), to turn on or off the control switching device, based on whether the first voltage is higher than the threshold level.

The transistor may be a Positive-Negative-Positive (PNP) type transistor.

The protection circuit may further include a Zener diode configured to be turned on based on the first voltage being higher than the threshold level to turn on the control switching device.

The protection circuit may further include a distribution resistor, and a resistance of the distribution resistor may be set to make the threshold voltage of the protection switching device to be within a variable range of the control voltage of the protection switching device.

The protection switching device may further include a control terminal and an output terminal. The control voltage may be provided to the control terminal. The distribution resistor may include: a first distribution resistor disposed to apply the input voltage to the control terminal, and a second distribution resistor disposed to be connected between the control terminal and the output terminal.

The electronic apparatus may further include a resistor connected in parallel to the output capacitor to prevent a voltage applied to the output capacitor from being higher than a set level upon turning off the protection switching device.

The electronic apparatus may further include a diode for allowing an electric current discharged from the inductor to freewheel upon turning off the protection switching device.

The electronic apparatus may further include an input capacitor connected in parallel to the switching device and allowing the freewheeling electric current to flow through the diode upon turning off the protection switching device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates resistances of distribution resistors which are set based on input voltages and output voltages according to an embodiment of the disclosure;

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present disclosure by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
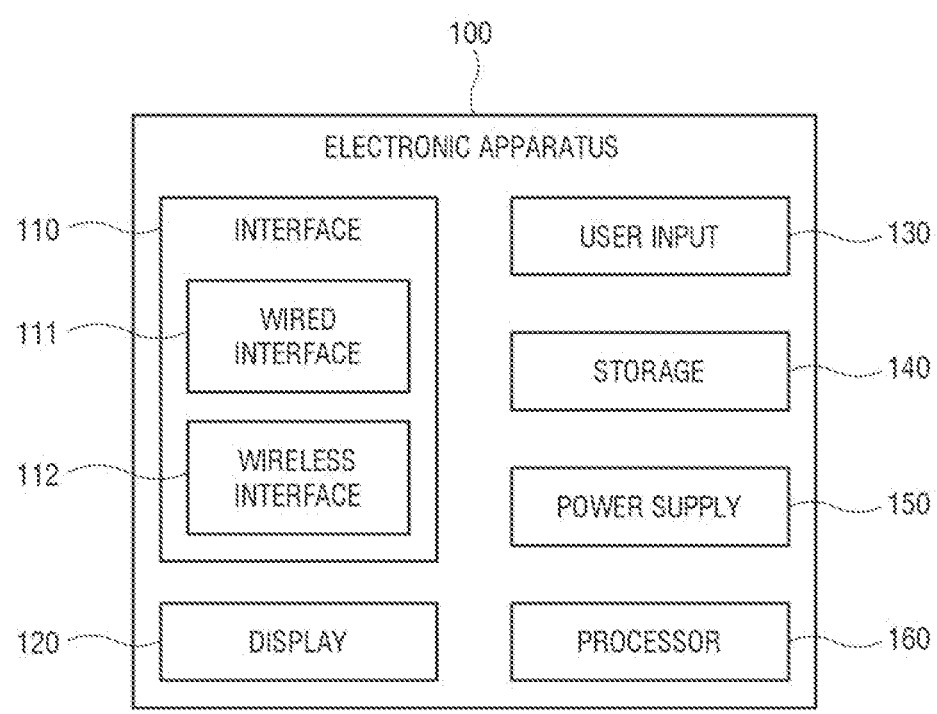
FIG. 1 illustrates a block diagram of an electronic apparatus.

FIG. 1 is a block diagram of an electronic apparatus.

As shown in FIG. 1, an electronic apparatus 100 includes various hardware element. According to an embodiment, the electronic apparatus 100 is implemented as a display apparatus. However, the display apparatus is merely one of various examples of the electronic apparatus 100. The electronic apparatus 100 may for example include a TV, a monitor, a digital signage, an electronic blackboard, an electronic picture frame, and the like stationary display apparatus; a set-top box, an optical multimedia player, and the like image processing apparatus; a computer or the like information processing apparatus; a smartphone, a tablet device, and the like mobile device; a camera, a camcorder or the like image capturing device; a washing machine, a refrigerator, a clothing manager, an air conditioner, an electric cleaner or the like home appliances; a wearable device that is worn on a user's body; a hub, a gateway, a router, an access point (AP) or the like communication device; etc.

The electronic apparatus 100 may include an interface 110. The interface 110 includes an interface circuit through which the electronic apparatus 100 performs communication with various types of external apparatuses and transmits and receives data. The interface 110 may include at least one of one or more wired interfaces 111 for wired communication, or one or more wireless interface 112 for wireless communication according to connection types.

The wired interface 111 includes a connector or port to which a cable of previously defined transmission standards is connected. For example, the wired interface 111 includes a port connecting with a terrestrial or satellite antenna to receive a broadcast signal or connecting with a cable for cable broadcasting. Further, the wired interface 111 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 111 includes a port of universal serial bus (USB) standards to connect with a USB device. Further, the wired interface 111 includes an optical port to which an optical cable is connected. Further, the wired interface 111 includes an audio input port to which an external microphone is connected, and an audio output port to which a headset, an earphone, a loudspeaker etc. is connected. Further, the wired interface 111 includes an Ethernet port connected to a gateway, a router, a hub, etc. for connection with the WAN.

The wireless interface 112 includes an interactive communication circuit including at least one of elements such as a communication module, a communication chip, etc. corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 100 may include the display 120. The display 120 forms a screen for displaying an image based on an image signal processed by the processor 160.

The display 120 includes a display panel, and the display panel may be designed to have various structures. For example, the display 120 may include a display panel having a light-receiving structure like liquid crystal, and a backlight unit illuminating the display panel. Alternatively, the display 120 may include a display panel having a self-emissive structure like an organic light emitting diode (OLED). Alternatively, the display 120 may include a plurality of micro light emitting diode (LED) modules combined in the form of tiles to form a large screen.

The electronic apparatus 100 may include a user input 130. The user input 130 includes a circuit related to various kinds of user input interfaces to be controlled by a user to thereby receive a user input. The user input 130 may be variously configured according to the kinds of electronic apparatus 100, and may for example include a mechanical or electronic button of the electronic apparatus 100, various kinds of sensors, a touch pad, a touch screen installed in the display, an external input device (e.g., a keyboard, a mouse, a remote controller, etc.) separated from the electronic apparatus 100 and connected through the interface 110, etc. Alternatively, the electronic apparatus 100 may receive a user's input signal from a predetermined external apparatus (e.g., a mobile device, etc.) through the interface 110 as well as the user input 130.

The electronic apparatus 100 may include a storage 140. The storage 140 is configured to store digitalized data. The storage 140 includes a nonvolatile storage in which data is retained regardless of whether power is supplied or not, and a volatile memory in which data loaded to be processed by a processor 170 is retained only when power is supplied. The storage includes a flash memory, a hard disc drive (HDD), a solid-state drive (SSD), a read only memory (ROM), etc., and the memory includes a buffer, a random-access memory (RAM), etc.

The electronic apparatus 100 may include a power supply 150. The power supply 150 supplies operating power to loads in the electronic apparatus 100. In one embodiment, the electronic apparatus 100 may include components included in the power supply 150. In one embodiment, the electronic apparatus 100 may perform functions performed by the power supply 150.

The power supply 150 may convert external alternating current (AC) power into direct current (DC) power, and may adjust the DC power to various voltage levels respectively required for the loads, thereby outputting the adjusted DC power to the loads. The power supply 150 may include a direct current-direct current (DC-DC) converter that steps down the voltage of the DC power to required levels, which will be described later.

The electronic apparatus 100 may include the processor 160. The processor 160 includes one or more hardware processors achieved by a central processing unit (CPU), a chipset, a buffer, a circuit, etc. which are mounted on a printed circuit board (PCB). Alternatively, the processor 170 may be designed as a system on chip (SoC). When the electronic apparatus 100 is a display apparatus, the processor 160 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC. The processor 160 reproduces predetermined content, thereby displaying an image of the content on the display 120.

Below, the DC-DC converter (hereinafter referred to as a converter) of the power supply 150 will be described later.

Figure 2:
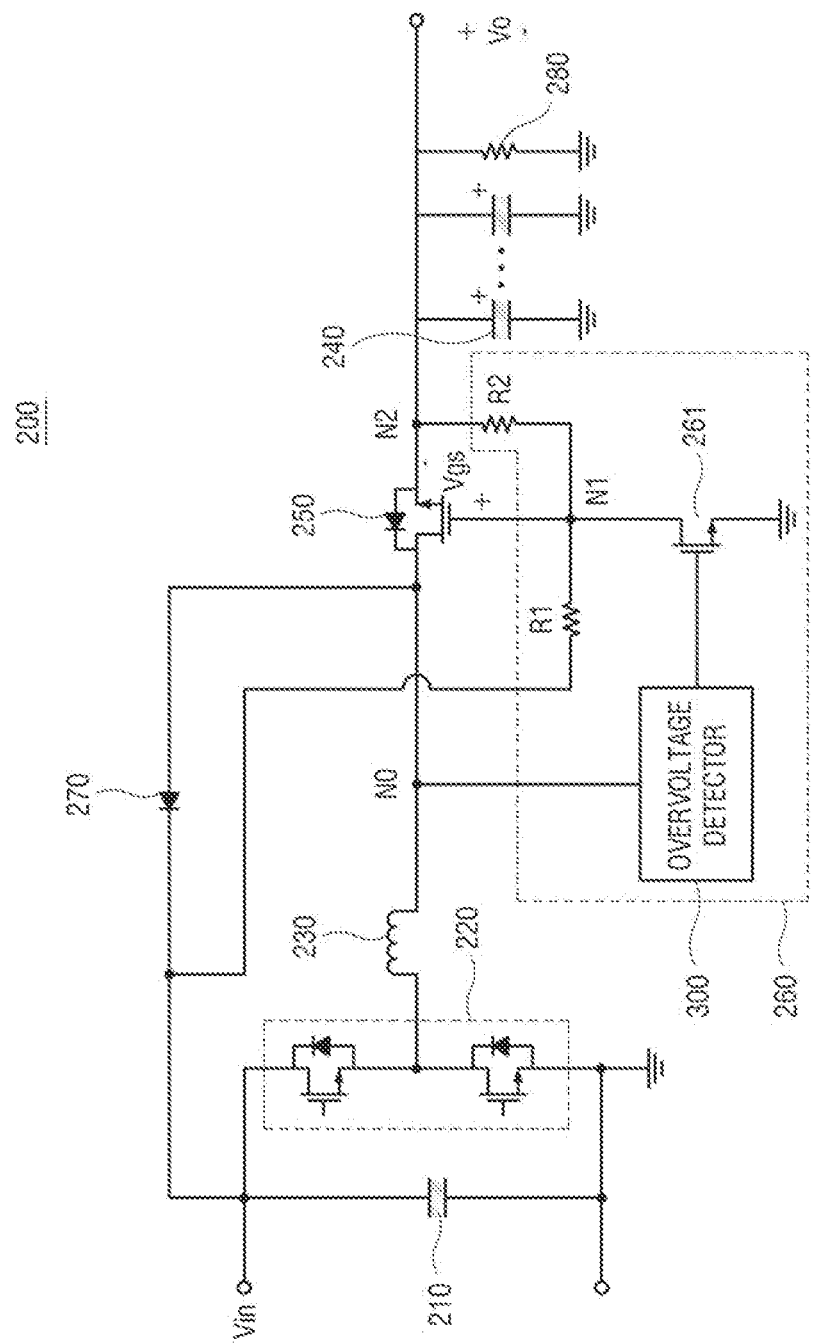
FIG. 2 illustrates a circuit diagram of a converter in a power supply according to an embodiment of the disclosure.

FIG. 2 is a circuit diagram of the converter in the power supply according to an embodiment of the disclosure.

As shown in FIGS. 1 and 2, the power supply 150 includes a converter 200 that receives an input voltage from an input side, steps down the input voltage into an output voltage, e.g., by a switching mode method, and outputs the output voltage to an output side. According to an embodiment, the converter 200 has a non-isolated circuit structure in which the input side and the output side are not isolated from each other.

In one embodiment, the converter 200 includes an input capacitor 210. The input capacitor 210 is a decoupling capacitor connected in parallel to the input side. The input capacitor 210 is provided in preparation for a case where the input voltage is mixed with noise or the input voltage fluctuates, so that a stable DC voltage can be transferred to a step-down switching device 220. For example, when an electric current applied to the load increases, the input voltage decreases. At this time, the input capacitor 210 discharges a voltage charged therein, thereby stabilizing the input voltage.

In one embodiment, the converter 200 includes the step-down switching device 220. The step-down switching device 220 steps down the input voltage into a lower output voltage by a pulse width modulation (PWM) operation, i.e., an operation based on the switching mode method of alternating between a turn-on (conducted) state and a turn-off (short-circuited) state. The output voltage of the converter 200 is calculated by multiplying a duty value of the step-down switching device 220 and the input voltage. In other words, when the input voltage is constant, the lower the duty value of the step-down switching device 220, the lower the output voltage. The step-down switching device 220 may for example include one or more transistors.

In one embodiment, the converter 200 includes an inductor 230. The inductor 230 is connected in series to the posterior end of the step-down switching device 220. The inductor 230 refers to a device for storing the energy of electric current, and has a coil structure. Such a coil structure of the inductor 230 serves to overlap magnetic fields in one direction. Once the magnetic field is formed, inertia is generated and thus an inertial current can flow for a predetermined period of time even though an electric current is cut off.

In other words, the inductor 230 is charged while the step-down switching device 220 is turned on, and discharged while the step-down switching device 220 is turned off, thereby maintaining the inertia of the electric current to stabilize the flow of the electric current.

In one embodiment, the converter 200 includes an output capacitor 240. The output capacitor 240 refers to a rectifying capacitor connected in parallel to the output side. As the step-down switching device 220 operates in the switching mode, the step-down switching device 220 outputs the output voltage in the form of a square wave. The output capacitor 240 changes such a square wave into a flat wave, thereby stabilizing the level of the output voltage. The converter 200 for stepping down a DC voltage according to an embodiment employs the output capacitor 240 which has a lower rated capacity than the input capacitor 210. Therefore, a plurality of output capacitors 240 are provided to satisfy a total capacity required at the output side. When the rated capacity of the output capacitor 240 is increased even though the output voltage is much lower than the input voltage, a manufacturing cost is significantly increased and it is also difficult to slim down the power supply 150, and furthermore the electronic apparatus 100.

With this structure, the converter 200 converts an input voltage (e.g., 70V) into a stepped-down output voltage (e.g., 20V). To prevent a relatively high input voltage from being transmitted to the output capacitor 240 as it is without being stepped down and damaging the output capacitor 240, the power supply 150 according to an embodiment includes elements as follows.

In one embodiment, the power supply 150 includes a protection switching device 250. The protection switching device 250 is provided between the inductor 230 and the output capacitor 240. The protection switching device 250 connects the inductor 230 and the output capacitor 240 when turned on, but disconnects the inductor 230 from the output capacitor 240 when turned off.

The protection switching device 250 according to an embodiment includes an N-channel field effect transistor (FET). The N-channel FET includes tree terminals of gate, drain, and source terminals. When voltage is applied to the gate terminal (i.e., control terminal), an electric current flows from the drain terminal to the source terminal (i.e., output terminal). The protection switching device 250 is turned on when a gate voltage (i.e., a voltage applied to the gate terminal or a potential difference between the gate terminal and the source terminal) is higher than a specific level, and turned off when the gate voltage is lower than the specific level. The specific level may be, for example, 0.7V, but not limited to this numerical value. The specific level may be varied depending on the characteristics of the protection switching device 250.

In one embodiment, the power supply 150 may include a protection circuit 260. The protection circuit 260 selectively turns on or off the protection switching device 250 based on a voltage between the inductor 230 and the protection switching device 250. In the protection circuit 260, a threshold level is set for overvoltage. The protection circuit 260 turns on the protection switching device 250 when it is detected that the voltage between the inductor 230 and the protection switching device 250 is lower than or equal to the threshold level, thereby transmitting the output voltage to the output side. On the other hand, the protection circuit 260 turns off the protection switching device 250 when it is detected that the voltage between the inductor 230 and the protection switching device 250 is higher than the threshold level.

In the converter 200, the rated capacity of the input capacitor 210 is designed to reflect the level of the input voltage, and the rated capacity of the output capacitor 240 is designed to reflect the level of the output voltage. Therefore, in a state that other designs are not reflected, when the input voltage is transmitted to the output capacitor 240 as it is without being stepped down, the voltage applied to the output capacitor 240 significantly exceeds the rated capacity of the output capacitor 240, thereby damaging the output capacitor 240. Like this, when overvoltage is applied to the output side, the step-down switching device 220 is short-circuited due to various causes (e.g., excessive increase in the output voltage), and thus the input voltage passes through the step-down switching device 220 as it is.

Therefore, according to an embodiment, the protection switching device 250 is provided at the anterior end of the output capacitor 240, and the protection circuit 260 turns off the protection switching device 250 when it is detected that the voltage applied to the anterior end of the protection switching device 250 corresponds to the overvoltage, thereby preventing the overvoltage from being applied to the output capacitor 240. Accordingly, the output capacitor 240 is protected from damage due to the overvoltage.

Below, the configuration of the protection circuit 260 will be described.

In one embodiment, the protection circuit 260 includes a control switching device 261. The control switching device 261 operates to control the protection switching device 250 to be turned on or off. The control switching device 261 includes an N-channel FET, of which a drain terminal is connected to the gate terminal of the protection switching device 250, and a source terminal is connected to the ground. While the control switching device 261 is turned on, the gate terminal of the protection switching device 250 is connected to the ground, and thus the protection switching device 250 is turned off.

On the other hand, while the control switching device 261 is turned off, the gate terminal of the protection switching device 250 becomes high, and thus the protection switching device 250 is turned on. In other words, the protection switching device 250 is in the opposite state to the control switching device 261.

In one embodiment, the protection circuit 260 includes an overvoltage detector 300. The overvoltage detector 300 detects the anterior end of the protection switching device 250, and specifically detects voltage applied to a node N0 between the inductor 230 and the protection switching device 250. The overvoltage detector 300 compares the voltage at the node N0 with a preset threshold level indicating the overvoltage. The overvoltage detector 300 allows the gate terminal of the control switching device 261 become low when the voltage at the node N0 is lower than the threshold level (i.e., a normal state), thereby turning off the control switching device 261.

On the other hand, the overvoltage detector 300 allows the gate terminal of the control switching device 261 become high when the voltage at the node N0 is higher than the threshold level (i.e., an overvoltage state), thereby turning on the control switching device 261.

In one embodiment, the protection circuit 260 includes one or more distribution resistors R1 and R2. The distribution resistors R1 and R2 are provided so that the control voltage for turning on or off the protection switching device 250 can be varied depending on variation in the input voltage or the output voltage and thus have a level corresponding to a threshold voltage for turning on or off the protection switching device 250. Here, the threshold voltage refers to a threshold level of voltage for distinguishing between the turned-on state and the turned-off state of the protection switching device 250. When the control voltage is higher than the threshold voltage, the protection switching device 250 becomes turned on.

When the control voltage is lower than the threshold voltage, the protection switching device 250 becomes turned off. In other words, the variable range of the control voltage varied depending on the variation in the input voltage or the output voltage is set by the distribution resistors R1 and R2, so that the threshold voltage can be within the variable range of the control voltage.

The control voltage corresponds to voltage between a first node N1 and the ground, or voltage between the gate terminal and the source terminal of the protection switching device 250. The control voltage takes the design characteristics of the protection switching device 250 into account.

For example, under the condition that the withstand voltage of the protection switching device 250 is about 20V and the threshold voltage is 7V, the protection switching device 250 is considered to be turned off when the control voltage is lower than or equal to 7V, and turned on when the control voltage is higher than 7V.

In the state that wiring from the input side is provided to apply the input voltage to the gate terminal and the source terminal of the protection switching device 250, the distribution resistors R1 and R2 allow the input voltage to be respectively applied to the gate terminal and the source terminal of the protection switching device 250.

For example, the wiring from the input side may be provided so that the first node N1 between the gate terminal of the protection switching device 250 and the drain terminal of the control switching device 261 can be connected to a second node N2 between the source terminal of the protection switching device 250 and the output capacitor 240. Here, the distribution resistors R1 and R2 include a first distribution resistor R1 disposed between the input side and the first node N1, and a second distribution resistor R2 disposed between the first node N1 and the second node N2. The distribution resistors R1 and R2 will be described in detail later.

In one embodiment, the power supply 150 includes a freewheeling diode 270. When the protection switching device 250 is turned off due to the occurrence of overvoltage, an electric current discharged from the inductor 230 cannot be transmitted to the output side. In this case, the freewheeling diode 270 performs a freewheeling operation to guide the electric current from the inductor 230 to the input capacitor 210 so as to prevent the protection switching device 250 from being damaged by the electric current from the inductor 230. Thus, the protection switching device 250 is prevented from being damaged be overvoltage.

Below, operations of the distribution resistors R1 and R2 will be described.

FIG. 3 shows resistances of the distribution resistors, which are set based on the input voltages and the output voltages, according to an embodiment of the disclosure.

As shown in FIGS. 2 and 3, the converter 200 is provided to apply the input voltage from the input side to the gate terminal of the protection switching device 250, so that the protection switching device 250 can be driven by the input voltage from the input side instead of a separate operating voltage. Here, the distribution resistors R1 and R2 distribute the input voltage applied to the protection switching device 250. Therefore, the protection switching device 250 is not only normally operated by the input voltage but also prevented from being damaged.

When the input voltage Vin, the output voltage Vout, the resistance R1 of the first distribution resistor R1, and the resistance R2 of the second distribution resistor R2 are given, the voltage Vgs between the gate terminal and the source terminal of the protection switching device 250 in the converter 200, according to an embodiment, satisfies $Vgs=(Vin-Vout)*(R2/(R1+R2))$. For example, the protection switching device 250 may have a withstand voltage (i.e., the maximum level of voltage that the protection switching device 250 can withstand) of 20V in the converter 200 of which the input voltage has a variable range of 54V to 70V and the output voltage has a variable range of 0V to 18V. In this case, the input voltage and the output voltage of the converter 200 have a minimum difference of 36V and a maximum difference of 70V therebetween.

In this case, the distribution resistors R1 and R2 are designed to have resistances of R1=72 Kohm and R2=24 Kohm. The control voltage Vgs has the maximum level of 17.5V, which is lower than the withstand voltage (e.g., 20V) of the protection switching device 250. Therefore, the distribution resistors R1 and R2 allow the protection switching device 250 to normally operate with the input voltage.

Further, the gate terminal of the protection switching device 250 is connected to the output side, and therefore the control voltage Vgs for turning on the protection switching device 250 is varied depending on the output voltage. The second distribution resistor R2 is provided between the gate terminal and the source terminal (or output side) of the protection switching device 250, so that the control voltage can have a level corresponding to the threshold voltage of the protection switching device 250. Further, the minimum level of the control voltage is designed to be sufficiently higher than the threshold voltage, and therefore there is no problem with a normal operation (i.e., keeping the protection switching device 250 turned on).

In one embodiment, the power supply 150 includes an output resistor 280 connected to the output side. The output resistor 280 prevents the voltage applied to the output capacitor 240 from increasing higher than the voltage set by the distribution resistors R1 and R2 due to overvoltage. For example, when Vin having the maximum level of 70V, Vout of 13V, R1=72 Kohm, R2=24 Kohm, and the output resistor 280 having a resistances Rd of Rd=10 Kohm are given, the converter 200 operates at a constant output voltage of 13V during a normal operation, and there are no effects due to the output resistor 280.

On the other hand, when only the input voltage is supplied under the condition that a separate operating voltage is not supplied (i.e., a constant voltage control operation is not possible), the output capacitor 240 may be damaged as the output voltage gradually increases. However, the output resistor 280 makes the output voltage satisfy the condition of $Vout=Vin*(Rd/(R1+R2+Rd))$, thereby preventing the output voltage from increasing higher than $70*(10/(72+24+10))=6.6V$. Therefore, the output capacitor 240 is protected from damage. In other words, the input voltage is charged in the output capacitor 240 through the distribution resistors R1 and R2, and the output resistor 280 prevents a voltage higher than or equal to the level set in the converter 200 from exceeding the rated capacity of the output capacitor 240.

Below, variation in the operating waveforms of the converter 200 will be described.

Figure 4:
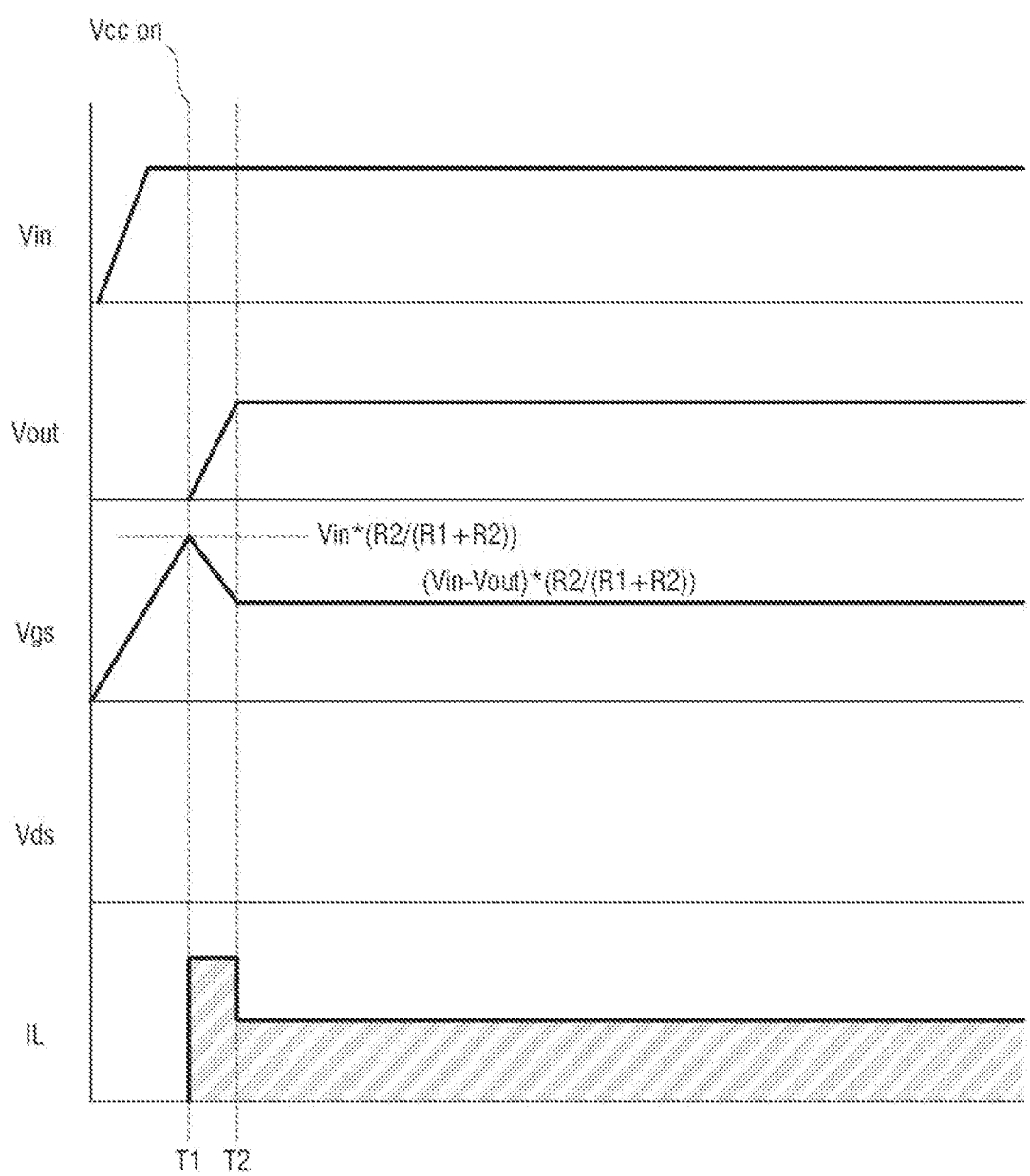
FIG. 4 illustrates operating waveforms of a converter at a normal operation according to an embodiment of the disclosure.

FIG. 4 illustrates the operating waveforms of the converter at a normal operation according to an embodiment of the disclosure.

As shown in FIGS. 2 and 4, five waveforms are illustrated. From above, the waveforms are the input voltage Vin, the output voltage Vout, the control voltage Vgs between the gate terminal and the source terminal of the protection switching device 250, the voltage Vds between the drain terminal and the source terminal of the protection switching device 250, and the current IL of the converter 200, respectively.

From the start of applying the input voltage to a point in time T1, the output voltage is 0. The Vgs increases in proportion to the increase of the input voltage. At the point in time T1, the control voltage Vgs is high enough to turn on the protection switching device 250 based on $Vgs=Vin*(R2/(R1+R2))$, and the output voltage begins to increase from this point in time. From the point in time T1 to a point in time T2, the control voltage Vgs decreases corresponding to the increase of the output voltage. At the point in time T2, the control voltage Vgs becomes stable at a level high enough to continuously turn on the protection switching device 250 based on Vgs=(Vin−Vout)*(R2/(R1+R2)), and the input voltage and the output voltage also have stable levels.

Figure 5:
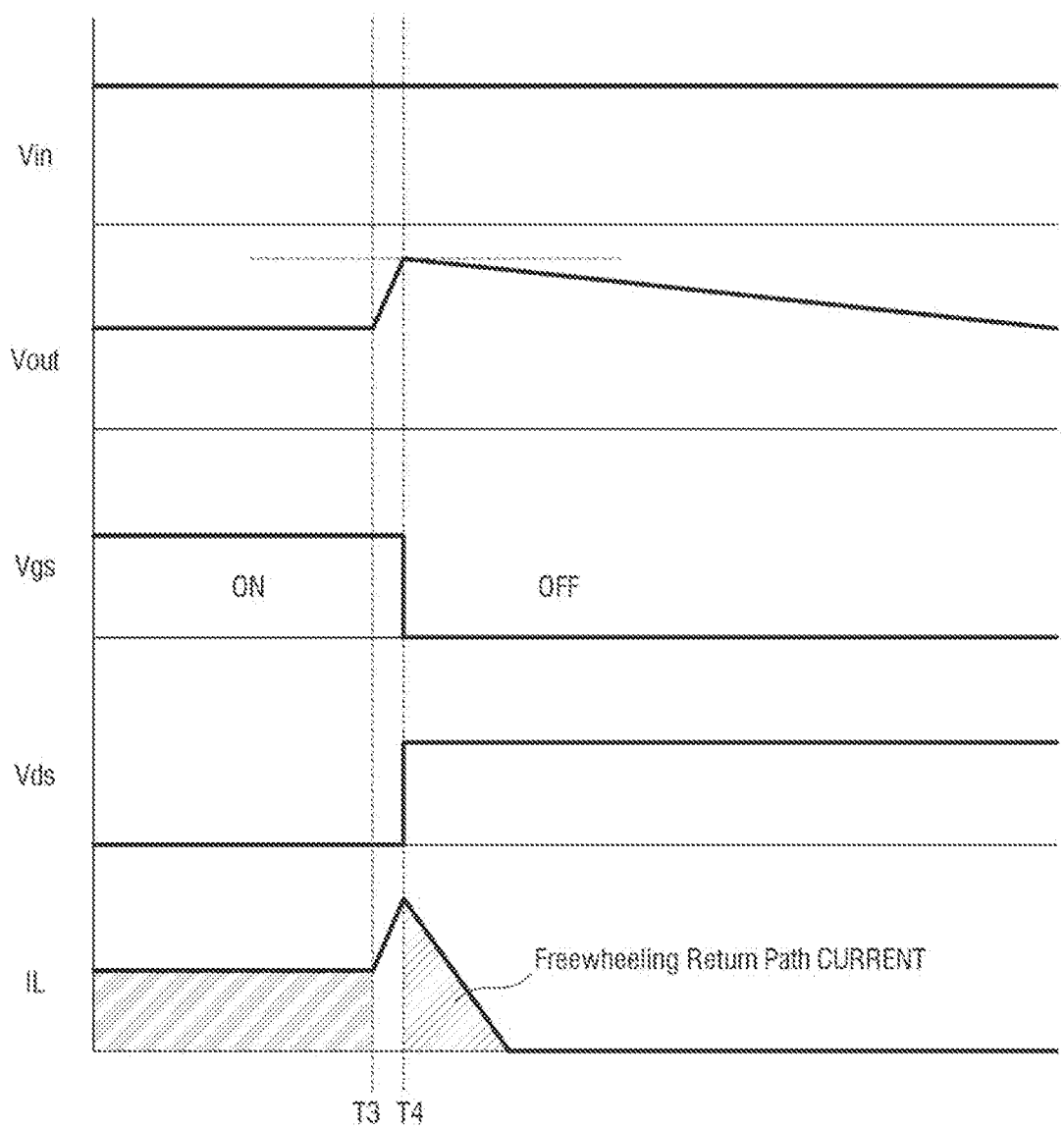
FIG. 5 illustrates operating waveforms of a converter at an overvoltage according to an embodiment of the disclosure.

FIG. 5 illustrates the operating waveforms of the converter at an overvoltage according to an embodiment of the disclosure.

As shown in FIGS. 2 and 5, the input voltage and the output voltage have stable levels before a point in time T3. In this section, the control voltage Vgs of the protection switching device 250 operates to keep the protection switching device 250 turned on based on (Vin−Vo)*(R2/(R1+R2)). When the step-down switching device 220 is shorted-circuited due to a certain cause at the point in time T3, the output voltage suddenly increases from the point in time T3. After the point in time T3, the output voltage continues to increase, and the voltage between the inductor 230 and the protection switching device 250 reaches an overvoltage-related threshold level set in the converter 200 at a point in time T4.

Accordingly, the control voltage Vgs is dropped to the ground level, and thus the protection switching device 250 becomes turned off. When the protection switching device 250 is turned off, the input side and the output side are disconnected from each other, and thus the output voltage decreases based on the discharge of the output capacitor 240.

In one embodiment, the freewheeling operation is performed by the freewheeling diode 270 in the anterior end of the protection switching device 250, and thus, the electric current discharged from the inductor 230 is charged in the input capacitor 210. Due to a freewheeling return path current of the freewheeling diode 270, the electric current in the converter 200 also decreases.

The foregoing operations of the converter 200 are as follows.

While the converter 200 operates normally, the voltage between the inductor 230 and the protection switching device 250 is low. Based on the low level of the voltage detected by the overvoltage detector 300, the control switching device 261 is turned off. As the control switching device 261 is turned off, the gate voltage of the protection switching device 250 becomes high and the protection switching device 250 becomes turned on by the distribution resistors R1 and R2. Therefore, the output voltage is output to the output side after passing through the protection switching device 250 and charging the output capacitor 240.

On the other hand, when overvoltage is applied to the converter 200, the voltage between the inductor 230 and the protection switching device 250 is high. Based on the high level of the voltage detected by the overvoltage detector 300, the control switching device 261 is turned on. As the control switching device 261 is turned on, the gate voltage of the protection switching device 250 becomes low and the protection switching device 250 becomes turned off by the ground. Therefore, the overvoltage is cut off by the protection switching device 250, and the output capacitor 240 and the output side are protected from the overvoltage. The freewheeling diode 270 guides the voltage from the inductor 230 to the input capacitor 210, thereby reducing the stress of the (turned-off) protection switching device 250.

Below, various exemplary designs of the overvoltage detector 300 will be described.

Figure 6:
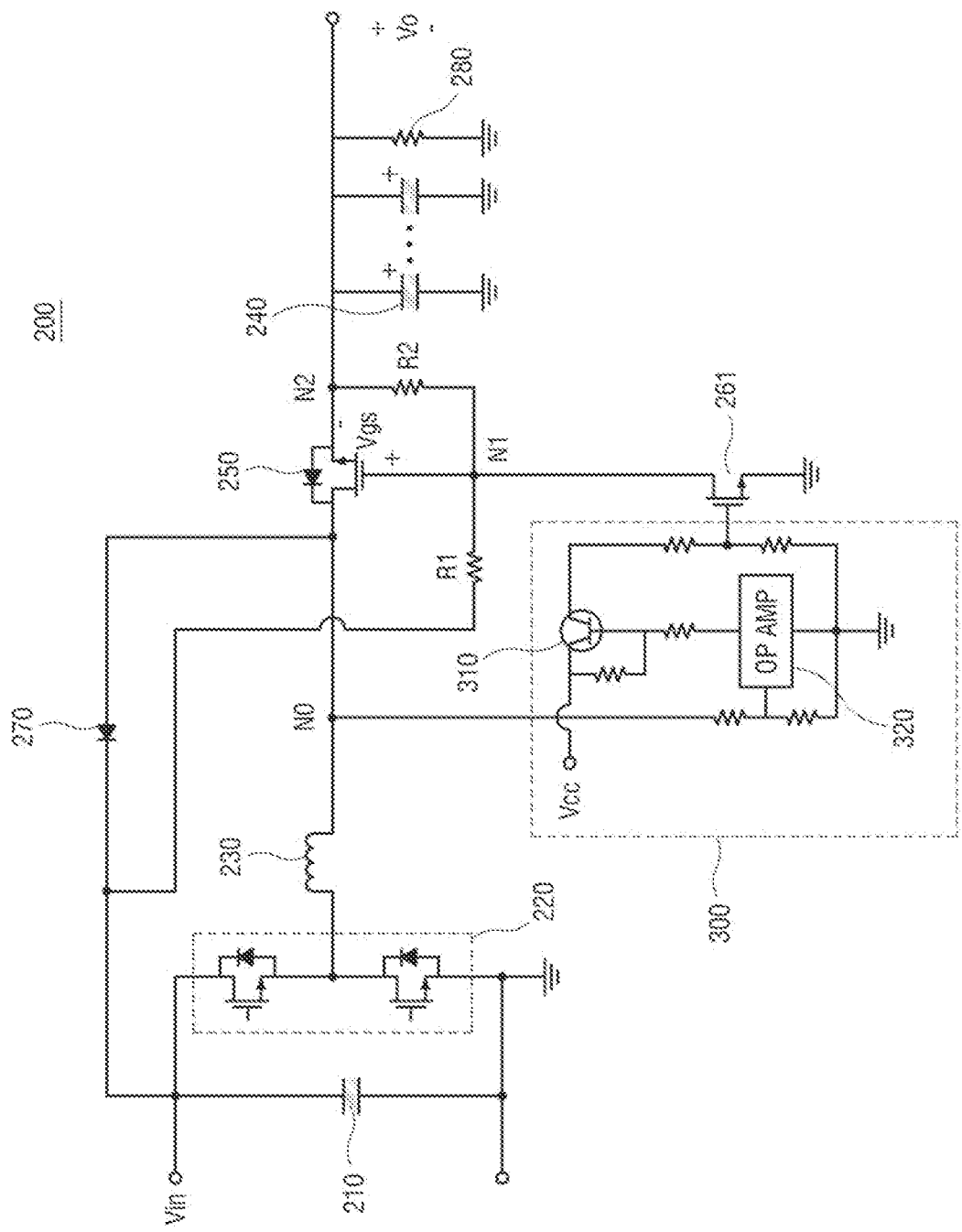
FIG. 6 illustrates a circuit diagram of an exemplary overvoltage detector according to an embodiment of the disclosure.

FIG. 6 is a circuit diagram of an exemplary overvoltage detector according to an embodiment of the disclosure.

As shown in FIGS. 2 and 6, the converter 200 includes the input capacitor 210, the step-down switching device 220, the inductor 230, the output capacitor, the protection switching device 250, the control switching device, the distribution resistors R1 and R2, the freewheeling diode 270, and the output resistor 280. These elements have been described in the embodiment with reference to FIG. 2, and therefore repetitive descriptions thereof will be avoided. In this embodiment, one example of various circuitries of the overvoltage detector 300 will be described.

The overvoltage detector 300 includes a transistor 310. The transistor 310 may, for example, include a Positive-Negative-Positive (PNP)-type bipolar transistor in which an electric current is allowed to flow from an emitter terminal to a collector terminal. The operating voltage is applied to the emitter terminal of the transistor 310, and the collector terminal of the transistor 310 is connected to the gate terminal of the control switching device 261. The transistor 310 is turned on when voltage applied to a base terminal (i.e., control terminal) is low, and turned off when the voltage is high.

The overvoltage detector 300 includes an operational amplifier (OP-Amp) 320. The OP-Amp 320 refers to a DC-connection type high-gain voltage amplifier having two differential inputs and one output. The output of the OP-Amp 320 is connected to the base terminal of the transistor 310, and the input of the OP-Amp 320 is connected to the node N0 between the inductor 230 and the protection switching device 250, the gate terminal of the control switching device 261, and the ground.

In the case of normal operation, the voltage at the node N0 is lower than a reference voltage of the OP-Amp 320, and therefore the output of the OP-Amp 320 becomes high. In other words, a base voltage becomes high, and thus, the (PNP-type) transistor 310 becomes turned off. The gate voltage of the control switching device 261 becomes low, and thus the control switching device 261 becomes turned off. The gate voltage of the protection switching device 250 becomes high, and the protection switching device 250 becomes turned on.

In the case of overvoltage, the voltage at the node N0 is higher than the reference voltage of the OP-Amp 320, and therefore the output of the OP-Amp 320 becomes low. In other words, the base voltage becomes low, and thus the (PNP-type) transistor 310 becomes turned on. The gate voltage of the control switching device 261 becomes high, and thus the control switching device 261 becomes turned on. The gate voltage of the protection switching device 250 becomes low, and the protection switching device 250 becomes turned off.

Figure 7:
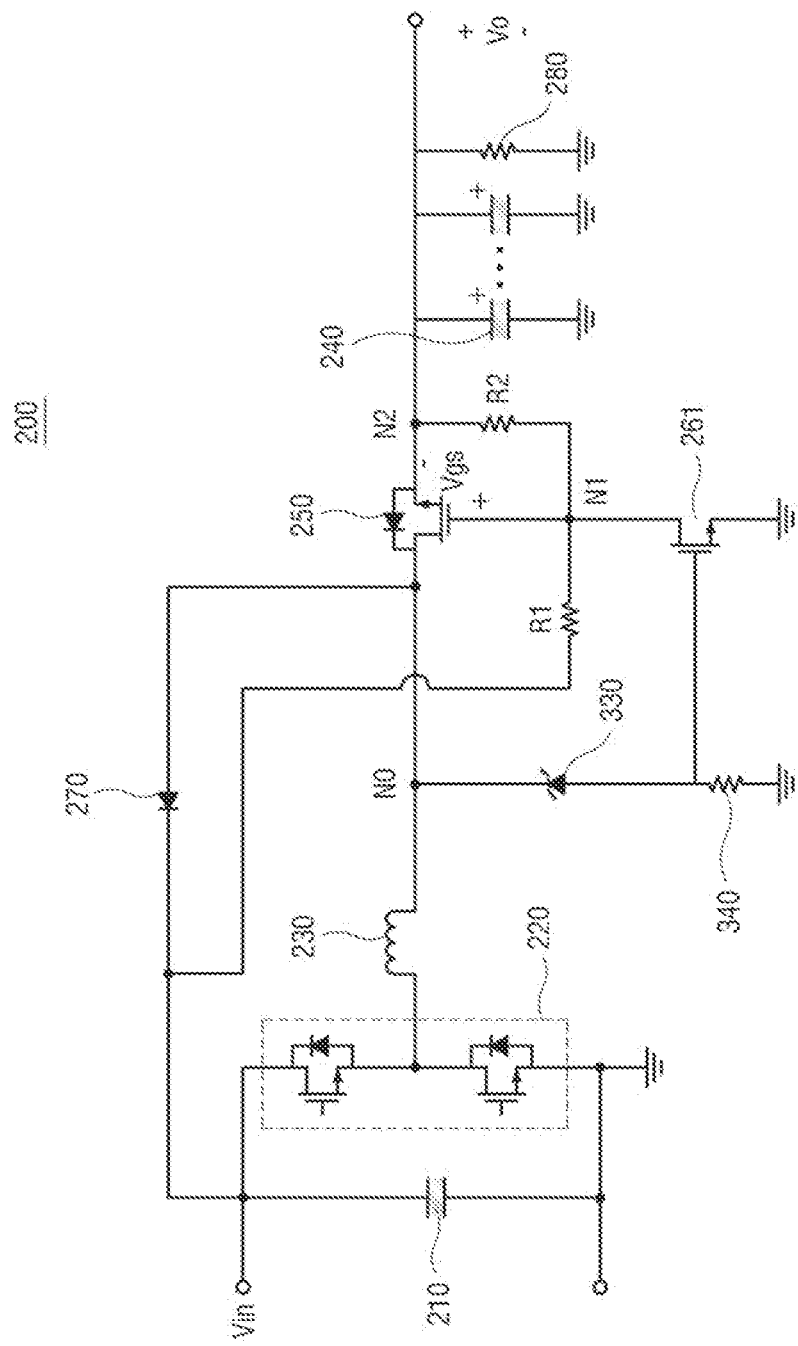
FIG. 7 is a circuit diagram of another exemplary overvoltage detector according to an embodiment of the disclosure.

FIG. 7 is a circuit diagram of another exemplary overvoltage detector according to an embodiment of the disclosure.

As shown in FIGS. 2 and 7, the overvoltage detector 300 includes a Zener diode 330. The Zener diode 330 refers to a diode that allows an electric current to flow when a voltage higher than or equal to a breakdown voltage is applied thereto in a reverse direction. In this embodiment, a backward terminal of the Zener diode 330 is connected to the node N0 between the inductor 230 and the protection switching device 250. Further, a forward terminal of the Zener diode 330 is connected to the gate terminal and the ground of the control switching device 261. Here, the forward terminal of the Zener diode 330 is connected to the ground via a resistor 340.

In the case of normal operation, the voltage at the node N0 becomes lower than the breakdown voltage, and therefore the Zener diode 330 becomes turned off. The gate voltage of the control switching device 261 becomes low, and thus the control switching device 261 become turned off. The gate voltage of the protection switching device 250 becomes high, and thus the protection switching device 250 becomes turned off.

In the case of overvoltage, the voltage at the node N0 becomes higher than the breakdown voltage, and therefore the Zener diode 330 becomes turned on. By the voltage passing through the Zener diode 330, the gate voltage of the control switching device 261 becomes high and the control switching device 261 becomes turned on. The gate voltage of the protection switching device 250 becomes low, and the protection switching device 250 becomes turned off.

For example, the voltage at the node N0 is 13V during the normal operation, the threshold level for identifying the overvoltage is set to 20V, and the minimum threshold voltage for turning on the control switching device 261 is designed to be about 3V. In this case, the breakdown voltage of the Zener diode 330 may be designed to be about 17V. With this configuration, when the voltage at the node N0 is higher than or equal to 20V, the gate voltage of the control switching device 261 becomes 3V or higher by the Zener diode 330, thereby turning on the control switching device 261. In this way, various circuitries may be used for the overvoltage detector 300.

What is claimed is:

1. An electronic apparatus comprising:
a converter comprising an inductor and an output capacitor, the converter being configured to provide an output voltage converted from an input voltage;
a protection switching device provided between the inductor and the output capacitor, the protection switching device being configured to be turned on or off to selectively connect the inductor and the output capacitor; and
a protection circuit configured to provide a control voltage to:
turn on the protection switching device based on a first voltage applied between the inductor and the protection switching device, the first voltage being lower than or equal to a threshold level corresponding overvoltage, and
turn off the protection switching device based on the first voltage, the first voltage being higher than the threshold level,
wherein the control voltage is varied depending on variation in the input voltage or the output voltage and having a level corresponding to a threshold voltage for turning on or off the protection switching device,
wherein the protection circuit comprises a plurality of distribution resistors configured to set a variable range of the control voltage,
wherein the threshold level is within the variable range of the control voltage,
wherein the protection switching device further comprises a control terminal and an output terminal,
wherein the control voltage is provided to the control terminal, and
wherein the plurality of distribution resistors comprises:
a first distribution resistor configured to apply the input voltage to the control terminal, and
a second distribution resistor connected between the control terminal and the output terminal.

2. The electronic apparatus of claim 1, wherein the protection circuit comprises:
a control switching device configured to be turned on or off to selectively connect the control terminal of the protection switching device to a ground; and
an overvoltage detector configured to turn on or off the control switching device based on whether the first voltage is overvoltage, and
wherein the control voltage is provided to the control terminal of the protection switching device.

3. The electronic apparatus of claim 2, wherein each of the protection switching device and the control switching device comprises an N-channel field effect transistor (FET).

4. The electronic apparatus of claim 2, wherein the overvoltage detector is further configured to:
turn off the control switching device based on the first voltage being lower than or equal to the threshold level; and
turn on the control switching device based on the first voltage being higher than the threshold level.

5. The electronic apparatus of claim 2, wherein the overvoltage detector comprises a transistor configured to be selectively switched, by an operational amplifier, to turn on or off the control switching device, based on whether the first voltage is higher than the threshold level.

6. The electronic apparatus of claim 5, wherein the transistor is a Positive-Negative-Positive (PNP) type transistor.

7. The electronic apparatus of claim 2, wherein the protection circuit further comprises a Zener diode configured to be turned on based on the first voltage being higher than the threshold level to turn on the control switching device.

8. The electronic apparatus of claim 1, further comprising a resistor connected in parallel to the output capacitor and configured to prevent a voltage applied to the output capacitor from being higher than a set level upon turning off the protection switching device.

9. The electronic apparatus of claim 1, further comprising a diode configured to allow an electric current discharged from the inductor to freewheel upon turning off the protection switching device.

10. The electronic apparatus of claim 9, further comprising an input capacitor connected in parallel to the protection switching device and configured to allow the freewheeling electric current to flow through the diode upon turning off the protection switching device.

* * * * *